(12) United States Patent
Lim et al.

(10) Patent No.: US 8,041,366 B2
(45) Date of Patent: Oct. 18, 2011

(54) APPARATUS AND METHOD FOR MANAGING MESSAGE IN A MOBILE COMMUNICATION SYSTEM

(75) Inventors: Seok-Hun Lim, Suwon-si (KR); Jae-Sung Ahn, Suwon-si (KR); Seung-Eop Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 633 days.

(21) Appl. No.: 11/713,075

(22) Filed: Mar. 1, 2007

(65) Prior Publication Data
US 2007/0213072 A1      Sep. 13, 2007

(30) Foreign Application Priority Data

Mar. 3, 2006  (KR) .................. 10-2006-0020239

(51) Int. Cl.
*H04Q 1/00* (2006.01)

(52) U.S. Cl. ............. 455/456.1; 455/414.4; 455/404.2

(58) Field of Classification Search .............. 455/456.1, 455/414.1, 4, 404.2, 422.1, 432.3, 433, 404, 455/41
See application file for complete search history.

(56) References Cited

U.S. PATENT DOCUMENTS

| | | | |
|---|---|---|---|
| 6,665,531 B1 * | 12/2003 | Soderbacka et al. | 455/412.1 |
| 7,113,781 B1 * | 9/2006 | Allison et al. | 455/432.1 |
| 7,196,639 B2 * | 3/2007 | Joyce et al. | 340/995.12 |
| 7,421,278 B2 * | 9/2008 | Srinivasan et al. | 455/456.3 |
| 2003/0096625 A1 * | 5/2003 | Lee et al. | 455/466 |
| 2004/0063445 A1 * | 4/2004 | Vaananen | 455/466 |
| 2004/0203746 A1 * | 10/2004 | Knauerhase et al. | 455/432.1 |
| 2005/0124360 A1 * | 6/2005 | Choi | 455/466 |
| 2005/0216334 A1 * | 9/2005 | Mehrabani-Farsi | 705/14 |
| 2005/0239495 A1 * | 10/2005 | Bayne | 455/550.1 |
| 2006/0089128 A1 * | 4/2006 | Smith et al. | 455/412.1 |
| 2006/0178932 A1 * | 8/2006 | Lang | 705/14 |

\* cited by examiner

*Primary Examiner* — Jean Gelin
(74) *Attorney, Agent, or Firm* — The Farell Law Firm, P.C.

(57) ABSTRACT

Provided are an apparatus and a method for transmitting and deleting a regional information message that is available and effective only in a specific zone in a mobile communication system. A Base Station (BS) communicates with an Mobile Station (MS) using a radio resource and transmits information about whether the MS is located in a service zone of the BS to an Home Location Register (HLR). The HLR transmits location information of the MS to a message control server. The location information indicates whether the MS is located in a zone for transmitting the regional information message. The message control server transmits the regional information message or a deletion request message for deleting the regional information message to the MS depending on the location information of the MS.

6 Claims, 6 Drawing Sheets

APPARATUS AND METHOD FOR MANAGING MESSAGE IN A MOBILE COMMUNICATION SYSTEM

PRIORITY

This application claims priority under 35 U.S.C. §119 to an application entitled "Apparatus and Method for Managing Message in a Mobile Communication System" filed in the Korean Intellectual Property Office on Mar. 3, 2006 and allocated Serial No. 2006-20239, the contents of which are incorporated herein by reference.

BACKGROUND OF THE INVENTION

1. Field of the Invention

The present invention relates generally to an apparatus and method for managing a message in a mobile communication system, and in particular, to an apparatus and method for selectively receiving a regional information message (i.e., a message that is available and effective only in a specific zone) at a mobile station (MS) in a mobile communication system and for automatically deleting the received regional information message from the MS when the MS leaves the specific zone.

2. Description of the Related Art

Recently, the use of mobile communication system is rapidly increasing with the development of communication technologies broadening the functions of mobile communication terminals. In addition to a call function, mobile communication terminals provide a variety of additional functions such as digital camera function, MP3 function, phonebook function, and short messaging service (SMS) function.

With a rapid increase in the use of a mobile communication service, the SMS function ranks, along with the call function, as the main function of mobile communication terminals. In addition to the SMS message, a multimedia messaging service (MMS) message is developed and used to transmit multimedia data such as music data and image data.

With rapid increase in the use of SMS message, mobile communication terminals are used to transmit messages related to advertisements or announcements for a specific zone. Hereinafter, the messages related to advertisements or announcements for a specific zone will be simply referred to as "regional information messages". When a mobile communication terminal is located in the specific zone, the regional information messages are then transmitted to the mobile communication terminal.

The regional information messages are available and effective only in the specific zone. Therefore, when the mobile communication terminal leaves the specific zone, the regional information messages become unnecessary. These unnecessary regional information messages may lead to lessen the memory capacity of the mobile communication terminal. In this case, a user of the mobile communication terminal is inconvenienced because he/she must manually delete the unnecessary regional information messages one by one.

What is therefore required is a technique for selectively receiving the regional information messages only in a desired zone and for automatically deleting the unnecessary regional information messages.

SUMMARY OF THE INVENTION

An object of the present invention is to substantially solve at least the above problems and/or disadvantages and to provide at least the advantages below. Accordingly, an object of the present invention is to provide an apparatus and method for automatically deleting a regional information message from an MS by using a control message.

Another object of the present invention is to provide an apparatus and method for automatically deleting a regional information message from an MS by using a Base Station (BS) ID or a zone ID.

A further object of the present invention is to provide an apparatus and method for selectively receiving a regional information message at an MS by using a teleservice ID.

According to one aspect of the present invention, there is provided an apparatus for transmitting and deleting a regional information message that is available and effective only in a specific zone, the apparatus includes a BS for communicating with an MS using a radio resource and transmitting information about whether the MS is located in a service zone of the BS to an Home Location Register (HLR); the HLR for transmitting location information of the MS to a message control server, the location information indicating whether the MS is located in a zone for transmitting the regional information message; and the message control server for transmitting to the MS depending on the location information of the MS, the regional information message or a deletion request message for deleting the regional information message.

According to another aspect of the present invention, there is provided a method for selectively receiving a regional information message at an MS in a mobile communication system, the method includes receiving a message and determining whether the received message is a regional information message; if the received message is a regional information message, determining whether a regional information message RX mode is set or not; and if the regional information message RX mode is set, informing the receipt of the regional information message using a New Message alert sound or message.

According to a further aspect of the present invention, there is provided a method for deleting a regional information message that is available and effective only in a specific zone in a mobile communication system, the method includes transmitting, from a BS to an HLR, an information signal indicating that an MS leaves a service zone of the BS; upon receipt of the information signal, informing a message control server that the MS has left the specific zone; and transmitting, from the message control server to the MS, a deletion request message for deleting the regional information message from the MS.

According to still another aspect of the present invention, there is provided a method for deleting a regional information message from an MS in a mobile communication system, the method includes upon receipt of the regional information message, detecting a zone ID of a region where the regional information message is received; periodically polling the zone ID to determine whether the zone ID is changed; and if the zone ID is changed, selecting and deleting only the regional information message among messages stored in the MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for selectively receiving a regional information message in a mobile communication system and for automatically deleting the received regional information message. The regional information message refers to a message that is available and effective only in a specific zone. Examples of the regional information message include an announcement message of a specific company and a traffic information message of a specific zone. Examples of the message include an SMS message, an MMS message, and an enhanced Message Service (EMS) message. Depending on mobile communication service providers, the specific zone may be discerned using a BS or a global positioning system (GPS). The following description is made using an exemplary case where the specific zone is discerned using a BS.

In the present invention, an MS selectively receives the regional information message when it enters the specific zone. The received regional information message is deleted when the MS leaves the specific zone. In a first embodiment of the present invention, the received regional information message is deleted by transmitting a deletion request message to the MS. In a second embodiment of the present invention, the received regional information message is deleted by using a BS ID or a zone ID that is received at the MS.

Hereinafter, methods for receiving and deleting a regional information message at the MS will be described in detail with reference to the accompanying drawings.

Figure 1:
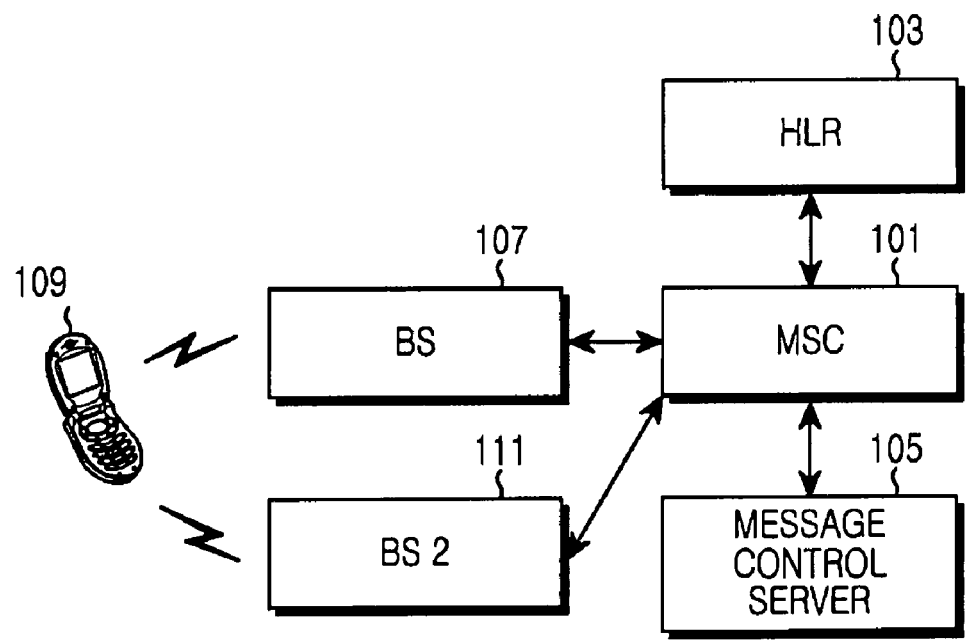
FIG. 1 is a block diagram of a typical mobile communication system for transmitting/receiving a message according to the present invention.

Referring to FIG. 1, the Mobile Communication System includes a Mobile Switching Center (MSC) 101, a Home Location Register (HLR) 103, a Message Control Server 105, a BS (107) and an MS 109. If MS 109 moves to a service area covered by BS2(111), then BS2(111) in included in the Mobile Communication System.

The MSC 101 manages a plurality of BSs and controls allocation of communication channels to the BSs. That is, the MSC 101 processes a call request from the BS 107.

The HLR 103 manages information of MSs registered in the service zone (i.e., coverage) of the BS 107. When the MS 109 enters the service zone of the BS 107 to receive a communication service, the HLR 103 temporarily stores information of the MS 109. The MS information includes a mobile identification number (MIN), an electronic serial number (ESN), and a service type.

In addition, when the MS 109 is registered in the service zone of the BS 107, the HLR 103 transmits, to the message control server 105, location registration information that indicates the MS 109 has been registered in the service zone of the BS 107. On the other hand, when the MS 109 leaves the service zone of the BS 107, the HLR 103 transmits, to the message control server 105, location registration release information that indicates the MS 109 has left the service zone of the BS 107.

When receiving the location registration information from the HLR 103, the message control server 105 transmits the regional information message of the service zone to the MS 109.

On the other hand, when receiving the location registration release information from the HLR 103, the message control server 105 transmits a deletion request message for deleting the regional information message to the MS 109. A teleservice ID or a separate field may be used to transmit the deletion request message to the MS 109. The teleservice ID is information indicating through which application a transmitted message must be serviced.

Teleservice IDs of messages transmitted to the MS 109 are used to discriminate between the messages. That is, a teleservice ID of a transmitted message is changed according to circumstances to indicate whether the transmitted message is the region information message or the deletion request message.

Using radio resources, the BS 107 communicates with the MSs in its service zone so that the MSs can communicate with other MSs.

The MS 109 performs a call function or a message communication function through the BS 107 using a radio resource. When receiving a message, the MS 109 detects a teleservice ID of the message to determine whether the message is the regional information message or the deletion request message. When receiving the deletion request message, the MS 109 deletes the corresponding regional information message.

The following description of the procedure is made assuming that a first BS 107 is a BS transmitting the regional information message and that the MS 109 is in a mode for receiving the regional information message. Hereinafter, the mode for receiving the regional information message will be simply referred as "regional information message RX mode".

Figure 2:
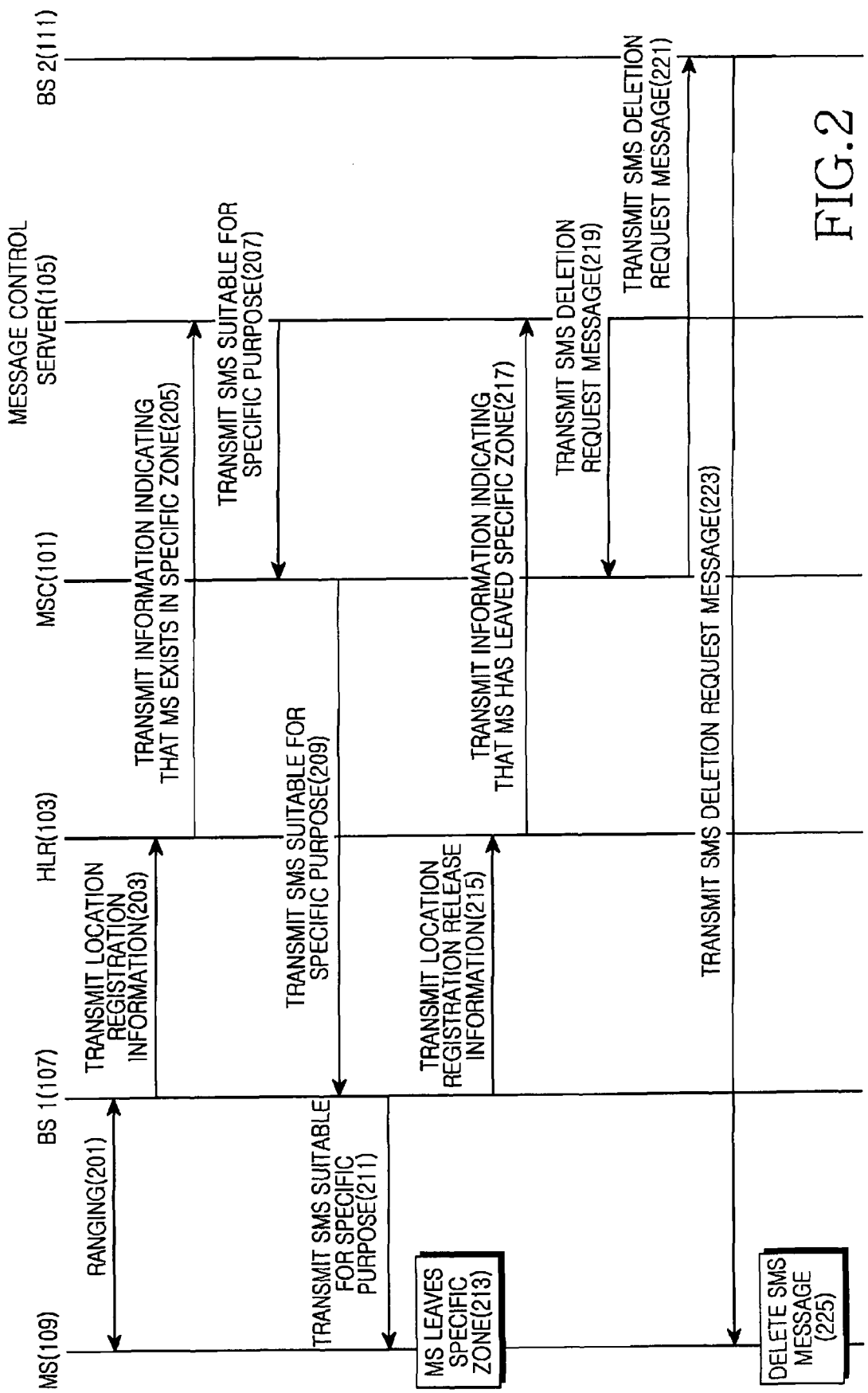
FIG. 2 is a flow diagram illustrating a procedure for transmitting, receiving and deleting a regional information message in a mobile communication system according to the present invention.

Referring to FIG. 2, the MS 109 enters the service zone of the first BS 107 and performs a ranging process for synchronization and initial access with respect to the first BS 107, in step 201.

When the MS 109 is registered in the service zone of the first BS 107, the first BS 107 transmits the location registration information of the MS 109 to the HLR 103 in step 203. Upon receipt of the location registration information, the HLR 103 stores the location information of the MS 109. In step 205, via the MSC 101, the HLR 103 informs the message control server 105 that the MS 109 has been registered in the service zone of the first BS 107.

In steps 207 through 211, the message control server 105 detects that the MS 109 has been registered in the service zone of the first BS 107 and then transmits the regional information message to the MS 109. Upon receipt of the regional information message, the MS 109 stores the regional information message. If the MS 109 is not in the regional information message RX mode, it rejects the receipt of the regional information message.

In step 213, the MS 109 leaves the service zone of the first BS 107 and enters the service zone of a second BS 111. In step 215, the first BS 107 transmits the location registration release information to the HLR 103.

In step 217, via MSC 101, HLR 103 informs the message control server 105 that the MS 109 has left the service zone of the first BS 107.

In steps 219 through 223, the message control server 105 detects that the MS 109 has left the service zone of the first BS 107 and then transmits the deletion request message for the regional information message to the MS 109 via the MSC 101 and the second BS 111.

Upon receipt of the deletion request message, MS 109 deletes the regional information message in step 225. For example, the deletion request message is implemented and transmitted using a teleservice ID field or another message field of the message illustrated in FIG. 6.

In an embodiment of the present invention, different teleservice IDs are used to discriminate between the regional information message and the deletion request message. When a received teleservice ID indicates the deletion request message, the regional information message corresponding to the teleservice ID is automatically deleted from the MS 109.

In another embodiment of the present invention, one teleservice ID is used to transmit a message and a separate message field is used to transmit the deletion request message.

Figure 6:
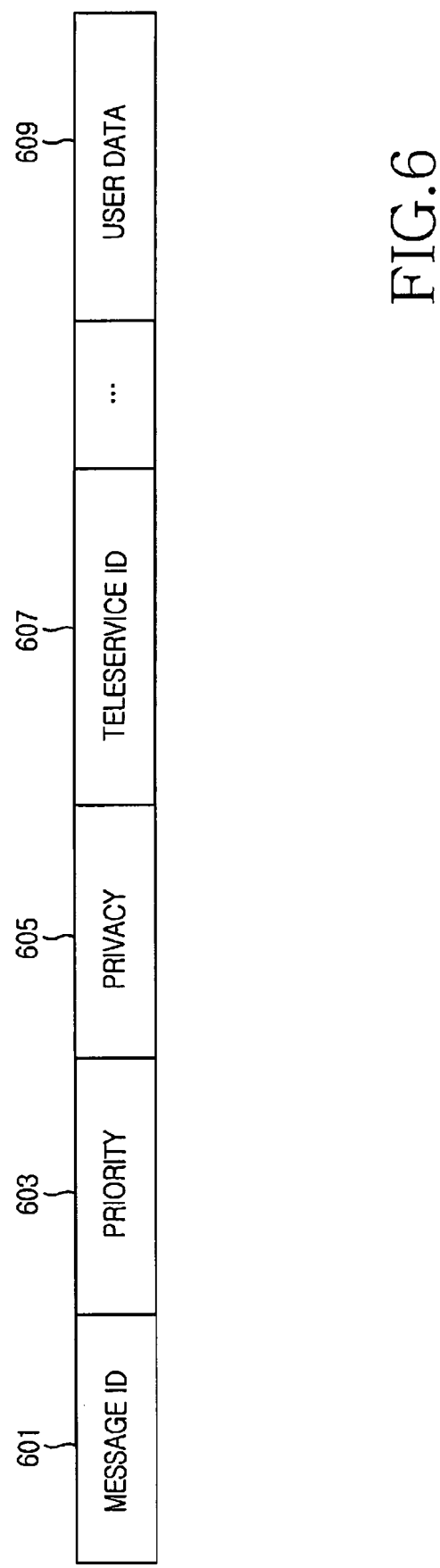
FIG. 6 is a diagram illustrating a message frame format according the present invention.

Referring to FIG. 6, one frame for transmitting the message includes a message ID field 601, a priority field 603, a privacy field 605, a teleservice ID field 607, a user data field 609, and additional fields (not illustrated) necessary for transmitting/receiving the message. Examples of the additional fields are a destination address field and a callback number field.

The message ID field 601 is used to discriminate between the messages. The priority field 603 is used to indicate the priority of the message.

The teleservice ID field 607 is used to indicate through which application a service must be provided. That is, the teleservice ID field 607 is used to indicate whether the message is the regional message or the deletion request message. The user data field 609 contains actual data.

Figure 3:
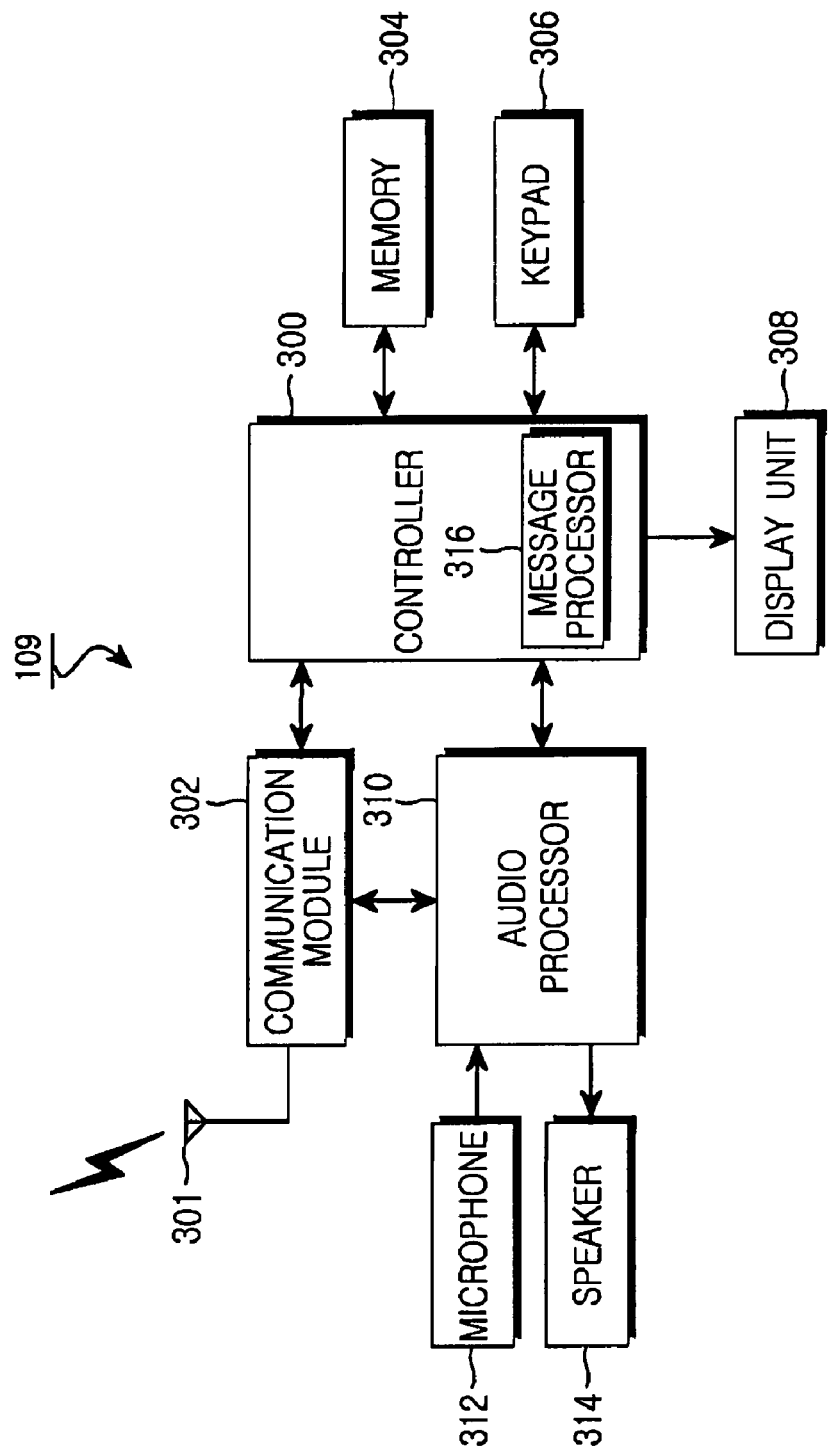
FIG. 3 is a block diagram of an MS according to the present invention.

Referring to FIG. 3, MS 109 includes an antenna (301), a controller 300, a communication module 302, a memory 304, a keypad 306, a display unit 308, an audio processor 310, a microphone 312, and a speaker 314. The controller 300 includes a message processor 316.

The controller 300 may be a microprocessor unit (MPU). The controller 300 controls the overall operation of MS 109. For example, the controller 300 processes and controls voice communication and data communication.

In addition to the general functions, the controller 300 analyzes a message received from the communication module 302. For example, using the teleservice ID of the received message, the controller 300 determines whether the received message is a regional information message or a deletion request message. When the received message is a regional information message, the controller 300 selectively receives the regional information message depending on whether a regional information message RX mode is set or not. On the other hand, when the received message is a deletion request message, the controller 300 checks the teleservice IDs of messages stored in the memory 304 and deletes only the regional information message.

The communication module 302 up-converts a baseband signal and transmits the resulting radio frequency (RF) signal through the antenna. In addition, the communication module 302 down-converts an RF signal received through the antenna.

The memory 304 temporarily stores a variety of data processed by the controller 300, and stores a variety of updatable data such as phone book data, outgoing messages, and incoming messages.

The keypad 306 provides the controller 300 with key input data that corresponds to a key pressed by a user. The display unit 110 displays information processed by the controller 300.

The audio processor 310 may be a coder-decoder CODEC. The audio processor 310 processes an audio signal received from the microphone 312 and outputs an audio signal through the speaker 314.

Figure 4:
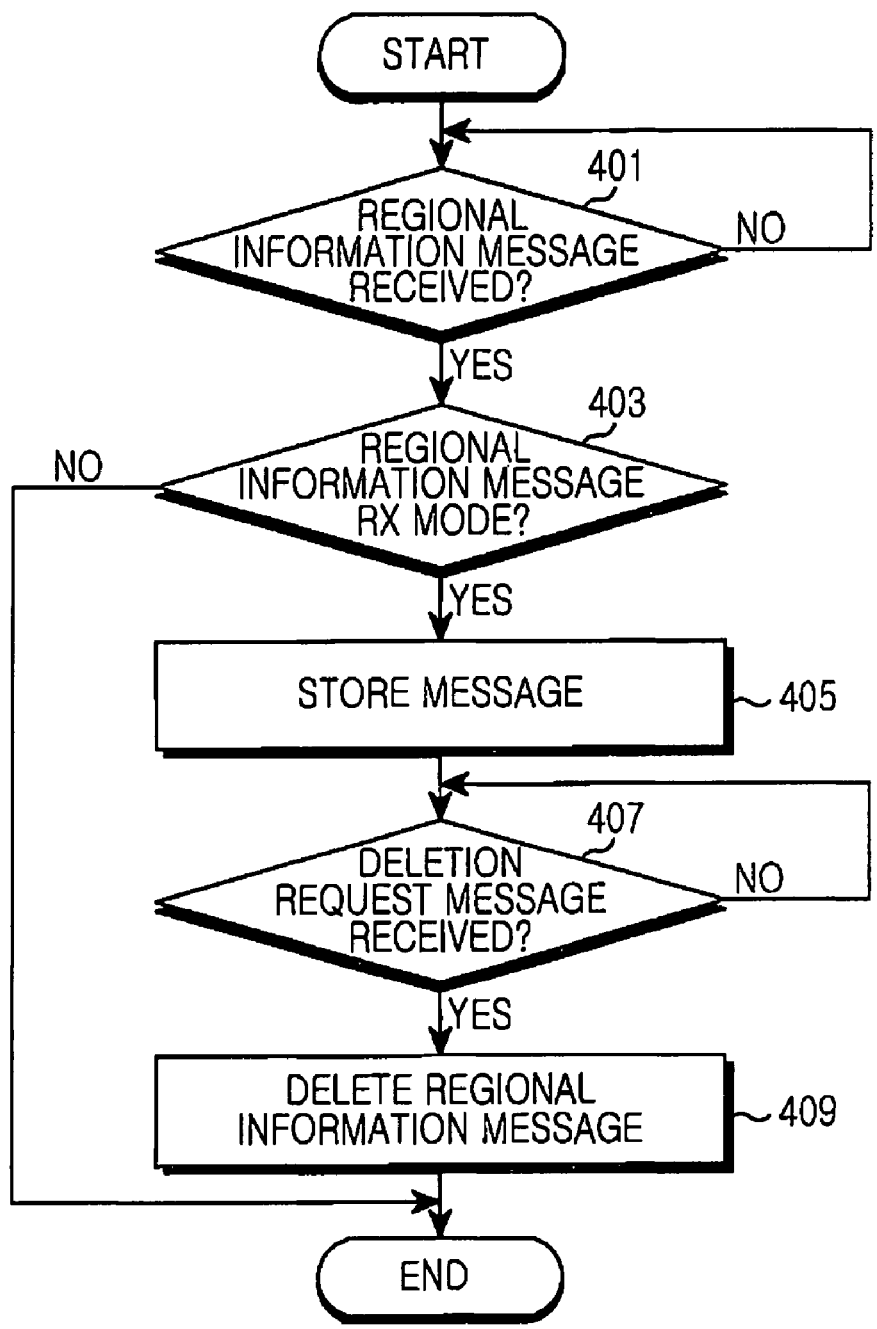
FIG. 4 is a flowchart illustrating a procedure for receiving and deleting a regional information message at an MS according to the present invention.

Hereinafter described with reference to FIG. 4 is a method for selectively receiving a regional information message at the MS 109 and for automatically deleting the received regional information message using the deletion request message.

Referring to FIG. 4, by checking a teleservice ID of a received message, the MS 109 determines in step 401 if the received message is a regional information message. If so, the procedure proceeds to step 403; and if not, step 401 is repeated after the received message is stored in the memory 304 and generating a New Message alert sound/message.

In step 403, the MS 109 determines if it is located in a specific zone and is set to a regional information message RX mode. If so, the procedure proceeds to step 405; and if not, the MS 109 rejects receipt of the regional information message and ends the procedure.

In step 405, the MS 109 generates a New Message alert sound/message and stores the regional information message in the memory 304.

In step 407, the MS 109 determines if it receives a deletion request message for the regional information message from the message control server 105. If so, the procedure proceeds to step 409; and if not, MS 109 repeats step 407. At this point, the deletion request message is transmitted using a separate message field or the teleservice ID that is contained in the message.

In step 409, the MS 109 detects the teleservice IDs of messages stored therein and deletes only messages with a teleservice ID corresponding to the regional information message. Thereafter, the MS 109 ends the procedure.

Figure 5:
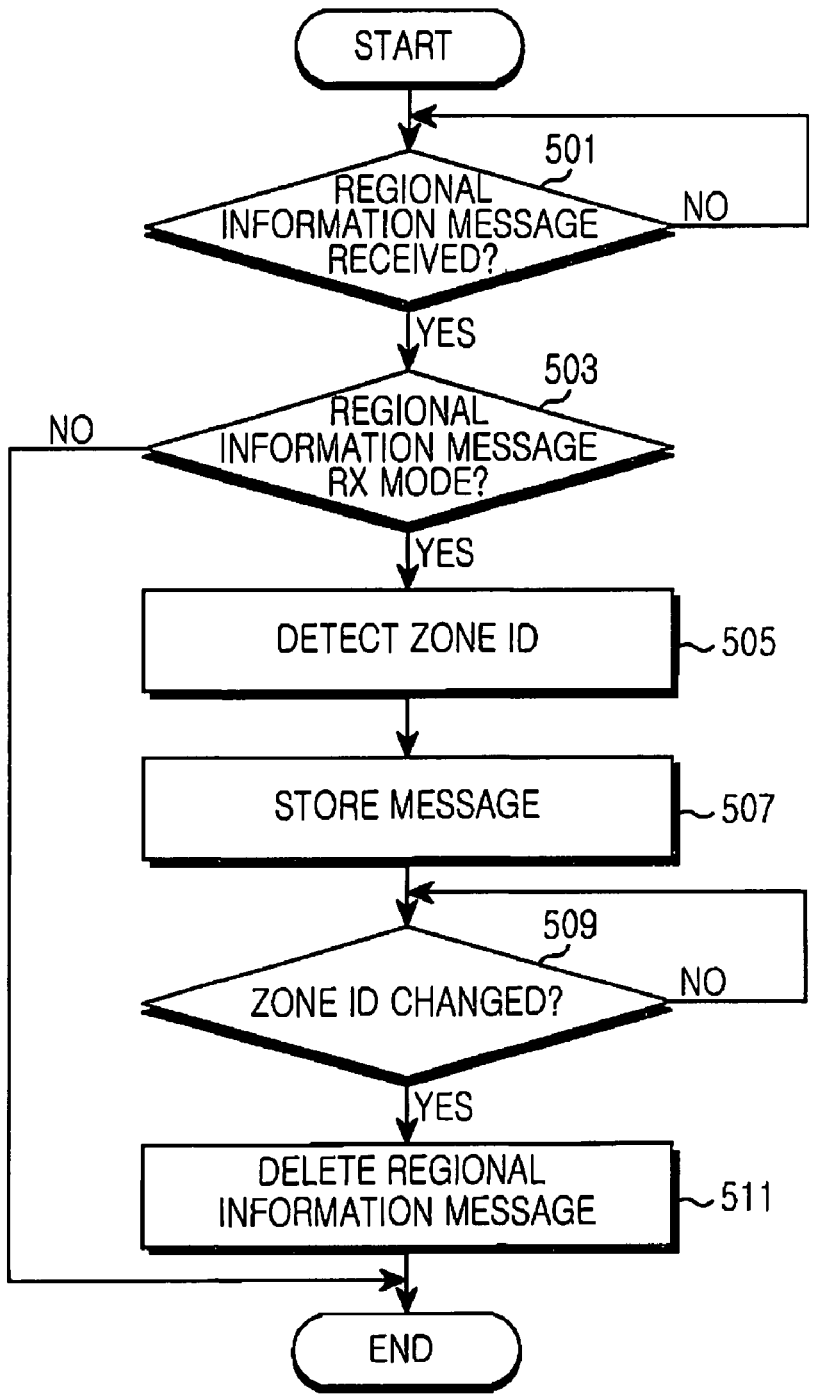
FIG. 5 is a flowchart illustrating a procedure for receiving and deleting a regional information message at an MS according to the present invention.

Hereinafter described with reference to FIG. 5 is a method for selectively receiving a regional information message at the MS 109 and for automatically deleting the received regional information message using a BS ID or a zone ID ? The zone ID is used to set a predetermined number of BSs to one zone and a plurality of zone IDs are used to discriminate between a plurality of zones. In the method, when the MS 109 leaves a specific zone providing a regional information message, a teleservice ID is provided that automatically deletes the regional information message. The fact that the MS 109 has left the specific zone is detected using the BS ID or the zone ID.

The following description is made using an exemplary case where a zone ID is used to delete the regional information message.

Referring to FIG. 5, by checking a teleservice ID of a received message, the MS 109 determines in step 501 if a received message is a regional information message. If so, the procedure proceeds to step 503; and if not, the MS 109 repeats step 501 after storing the received message in the memory 304 and generating a New Message alert sound/message.

In step 503, the MS 109 determines if it is located in a specific zone and is set to a regional information message RX mode. If so, the procedure proceeds to step 505; and if not, the MS 109 ends the procedure.

In step 505, the MS 109 detects a zone ID of a current region that has received the regional information message. In step 507, the MS 109 generates a New Message alert sound/message and stores the received regional information message in the memory 304.

In step 509, by periodically checking a current zone ID, the MS 109 determines if a zone ID is changed by movement of the MS 109. If so, the procedure proceeds to step 511; and if not, MS 109 repeats step 509.

In step 511, the MS 109 selects and deletes only the regional information message among messages stored in the memory 304. The regional information message is discerned using the teleservice ID contained in each message. Thereafter, the MS 109 ends the procedure.

In the above embodiment, the regional information message is discerned using the teleservice ID. In an alternative embodiment, the regional information message may be discerned using a separate message field.

As described above, the present invention makes it possible to selectively receive the regional information message in a mobile communication system and to automatically delete the received regional information message when the MS leaves the specific zone. Accordingly, it is possible to prevent a user of the MS from being inconvenienced by unnecessary regional information messages.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. An apparatus for transmitting and deleting a regional information message that is available and effective only in a service zone of a Base Station (BS), the apparatus comprising:
    the base station (BS) for communicating with a mobile station (MS) using a radio resource and transmitting information about whether the MS is located in the service zone of the BS to a home location register (HLR);
    the HLR for transmitting location information of the MS to a message control server, the location information indicating whether the MS is located in the service zone of the BS for transmission of the regional information message; and
    the message control server for transmitting the regional information message or a deletion request message for deleting the regional information message to the MS depending on the location information of the MS,
    wherein the message control server transmits the regional information message to the MS when the MS is located in the service zone of the BS and transmits the deletion request message to the MS when the MS leaves the service zone of the BS;
    wherein the MS determines whether a received message is the regional information message using a teleservice ID of the received message, only stores the regional information message when a regional information message RX mode is set in the MS, and deletes only the regional information message among messages stored therein based on a teleservice ID of the regional information message when receiving the deletion request message having the teleservice ID of the regional information message; and
    wherein the location of the MS is determined using the location information received from the HLR.

2. The apparatus of claim 1, wherein the message control server sets the teleservice ID of the deletion request message to a predetermined value.

3. The apparatus of claim 1, wherein the message is one of an SMS message, an e-mail message, an MMS message, and an EMS message.

4. A method for deleting a regional information message from a mobile terminal (MS) in a mobile communication system, the method comprising the steps of:
    determining whether a received message is the regional information message by a teleservice ID of the received message;
    detecting a zone ID of a region where the regional information message is received upon receipt of the regional information message;
    periodically measuring the zone ID to determine whether the zone ID is changed; and
    selecting and deleting only the regional information message among messages stored in the MS if the zone ID is changed.

5. The method of claim 4, further comprising detecting teleservice IDs of the stored messages to select only the regional information message.

6. The method of claim 4, wherein the regional information message is one of an SMS message, an e-mail message, an MMS message, and an EMS message.

* * * * *